2,932,664

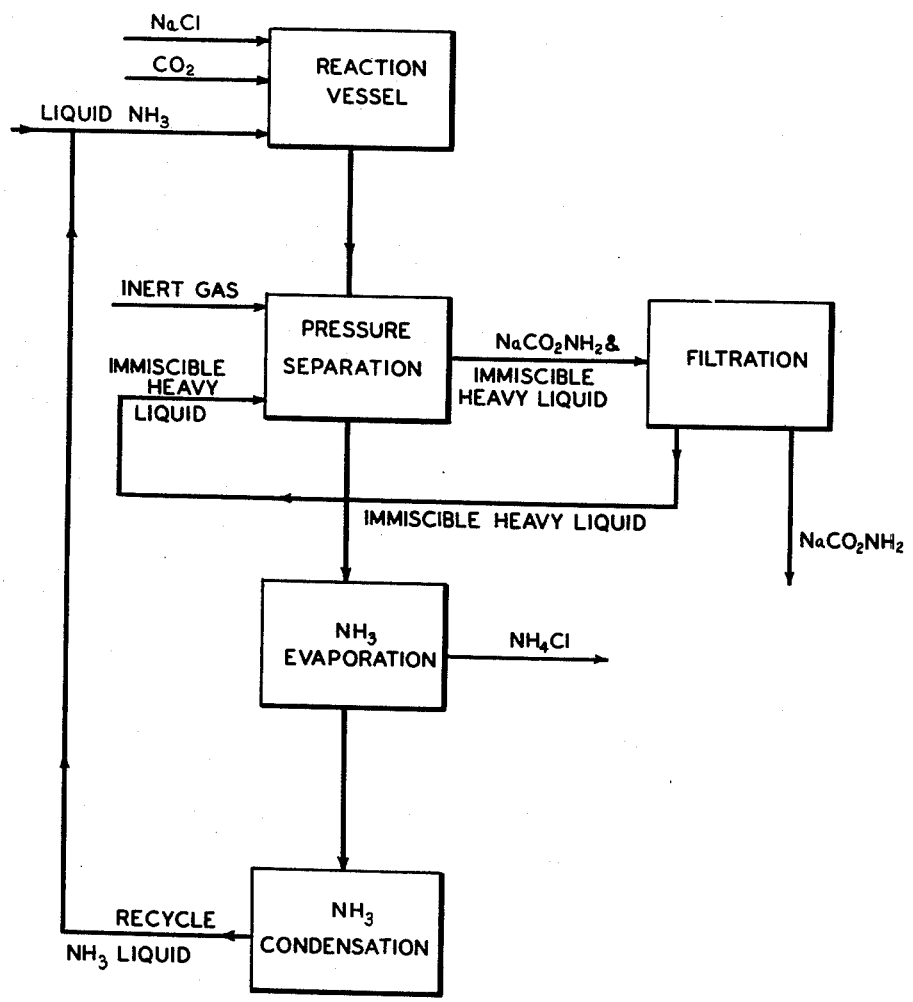

MANUFACTURE OF ALKALI CARBAMATES

Edward S. Roberts, New York, N.Y., assignor to Carbogen Corporation, New York, N.Y.

Application November 13, 1956, Serial No. 621,952

3 Claims. (Cl. 260—534)

This invention relates to improvements in the production of carbamates of alkali metals. More specifically it relates to the production of carbamates of potassium and sodium from the corresponding chlorides.

The method disclosed in the prior art for producing such carbamates is to treat a salt of the metal dissolved in anhydrous ammonia with carbon dioxide. The reaction involved is given by the equation:

$$NaCl + CO_2 + 2NH_3 \rightarrow NaCO_2NH_2 + NH_4Cl$$

The carbamate is precipitated and is filtered off. The ammonium chloride remains dissolved in the liquid ammonia from which it is recovered by evaporation.

The cheap, available salts of the alkali metals such as the chlorides are not very soluble in anhydrous ammonia. For this reason it has been proposed to add some water to the liquid ammonia and so to improve the solubility of the chloride. However, the introduction of water increases the solubility of the carbamate which is relatively insoluble in anhydrous ammonia. It has also been proposed to add to the anhydrous ammonia a miscible liquid such as ethyl alcohol or acetone in order to improve the crystal form of the carbamate and so make it more easily filterable.

The operations of the prior art are generally conducted under pressure since the temperatures of liquid ammonia at atmospheric pressure are very low and reaction rates are therefore very slow. Although conducting reactions in liquid ammonia at ordinary temperatures is entirely feasible, difficulties occur which interfere with smooth operation. For example, filtration is difficult particularly since differential pressures are required for filtration, and such pressures are difficult to maintain because ordinarily all pressures are that of the saturated ammonia vapor. Crystal form of solids is important since solids will retain considerable liquid, and with liquid ammonia, or ammonia containing small quantities of other liquids, recovery of the ammonia from the solid requires fairly elaborate apparatus.

My invention involves the same reaction as the prior art and approximately the same conditions during the reaction stage. My improvement is in the method of handling the reaction mixture for the separation of the carbamate and recovery of ammonia. The accompanying flow sheet illustrates my invention. I conduct the reaction in the usual fashion and after the reaction has come to equilibrium, I add an immiscible liquid which is inert chemically. The liquid chosen is heavier than anhydrous ammonia and lighter than solid sodium carbamate. There is a wide choice of liquids as is shown in the examples below. The mixture is allowed to stand and the immiscible liquid collects below the ammonia solution of ammonium chloride. During this interval the sodium carbamate enters into the immiscible heavy liquid layer and remains suspended therein or even may settle in it. I also introduce at this stage some inert gas, for example nitrogen, to maintain a pressure higher than that of the liquid ammonia. I then separate the two liquid phases. Drawing the heavy liquid off the bottom, I now bring this to atmospheric pressure. It is then easy to separate the alkali metal carbamate from the immiscible heavy liquid, for example by filtration or centrifuging. The clear liquid is returned to the process. The ammonia solution of ammonium chloride has been separated as the upper or lighter layer. The ammonia is evaporated from it, and condensed for reuse, and the ammonium chloride recovered as solid.

A number of variations on the process are possible. For example, if desired, small amounts of water can be added to the anhydrous ammonia as is proposed in the prior art. Other miscible liquids can be added to improve crystal size and form provided of course such miscible liquids will remain in the ammonia layer.

Among the immiscible liquids which I have found satisfactory are toluene, cyclohexane and orthodichlorbenzene. There are many others which undoubtedly can be used, the criterion being immiscibility with anhydrous ammonia or the anhydrous ammonia phase used, and higher density than that phase. Preferably, the immiscible liquid should have a fair volatility but that is not a necessary requirement. If the liquid is volatile, recovery of the liquid adhering to the carbamate crystals is easy since it can be evaporated off and condensed. On the other hand, if the liquid is non-volatile, I may wash the carbamate with a volatile liquid in which the non-volatile liquid is soluble.

Example 1

100 grams of NaCl and 75 grams of $CO_2$ were added to 435 grams of liquid $NH_3$ and 400 grams of toluene in a closed vessel under agitation. The reaction mixture was brought to a temperature of 20° C. and the pressure brought to 30 atm. ga. by the addition of gaseous nitrogen. The reaction mixture was then led into a centrifuge installed in a pressure vessel which was connected through the vapor phase to the reaction vessel and placed below it to allow gravity flow of the slurry to the centrifuge. The toluene phase, being the heavy phase, contained the sodium carbamate suspended as a slurry and was separated in the centrifuge from the solution of ammonium chloride in liquid ammonia. The two liquid phases were collected separately under pressure. The toluene phase was let down to atmospheric pressure and filtered to recover the solid sodium carbamate of which 135 grams were recovered. The ammonia solution was let down to atmospheric pressure and the ammonia evaporated leaving 89 grams of ammonium chloride containing some carbamate.

Example 2

An operation identical to Example 1 was carried out using 127 grams of KCl instead of 100 g. of NaCl. 159 grams of potassium carbamate were recovered instead of 142 grams of sodium carbamate.

Example 3

An operation identical to Example 1 was carried out using cyclohexane instead of toluene.

Example 4

An operation identical to Example 1 was carried out using orthodichlorbenzene instead of toluene.

What I claim is:

1. In the production of carbamates of alkali metals from the alkali metal chlorides by reaction of said chlorides with carbon dioxide and liquid ammonia at super-atmospheric pressure sufficient to maintain ammonia in the liquid state, the improvement which consists in adding to said mixture a liquid taken from the class consisting of toluene, dichlorobenzene and cyclohexane, allowing the mixture to separate into two layers under super-atmospheric pressure, the upper of said layers containing an ammonia solution of ammonium chloride and the lower of said layers containing said liquid and said carbamate, separating said lower layer, reducing the pressure on said lower layer to atmospheric and separating said carbamate from said lower layer.

2. A method according to claim 1 in which an inert gas provides at least a part of said super-atmospheric pressure.

3. A method according to claim 1 in which said liquid ammonia contains a small amount of water.

References Cited in the file of this patent

UNITED STATES PATENTS

| | | |
|---|---|---|
| 1,945,314 | Hofsasz | Jan. 30, 1934 |
| 1,983,041 | MacMullin et al. | Dec. 4, 1934 |
| 2,003,378 | MacMullin | June 4, 1935 |
| 2,498,538 | Frejacques | Feb. 21, 1950 |

FOREIGN PATENTS

| | | |
|---|---|---|
| 200,058 | Switzerland | Dec. 1, 1938 |